United States Patent
Geen et al.

(10) Patent No.: US 9,212,908 B2
(45) Date of Patent: Dec. 15, 2015

(54) MEMS GYROSCOPES WITH REDUCED ERRORS

(75) Inventors: John A. Geen, Tewksbury, MA (US);
John F. Chang, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 575 days.

(21) Appl. No.: 13/456,706

(22) Filed: Apr. 26, 2012

(65) Prior Publication Data
US 2013/0283908 A1    Oct. 31, 2013

(51) Int. Cl.
*G01P 3/44* (2006.01)
*G01C 19/5719* (2012.01)
*G01C 19/574* (2012.01)

(52) U.S. Cl.
CPC .......... *G01C 19/5719* (2013.01); *G01C 19/574* (2013.01)

(58) Field of Classification Search
USPC ...................... 73/504.12, 1.37, 1.38
See application file for complete search history.

(56) References Cited

U.S. PATENT DOCUMENTS

| | | | |
|---|---|---|---|
| 2,309,853 A | 2/1943 | Lyman et al. | 33/204 |
| 2,455,939 A | 12/1948 | Meredith | 33/204 |
| 2,513,340 A | 7/1950 | Lyman | 264/1 |
| 4,267,478 A | 5/1981 | Ljung et al. | 310/315 |
| 4,755,057 A | 7/1988 | Curby et al. | 356/350 |
| 4,884,446 A | 12/1989 | Ljung | 73/505 |
| 5,025,346 A | 6/1991 | Tang et al. | 361/283 |
| 5,034,905 A | 7/1991 | Widdau et al. | 364/606 |
| 5,275,047 A | 1/1994 | Zabler et al. | 73/505 |
| 5,349,855 A | 9/1994 | Bernstein et al. | 73/505 |
| 5,359,893 A | 11/1994 | Dunn | 73/505 |
| 5,392,650 A | 2/1995 | O'Brien et al. | 73/517 |
| 5,635,640 A | 6/1997 | Geen | 73/504.12 |
| 5,656,778 A | 8/1997 | Roszhart | 73/504.04 |
| 5,869,760 A | 2/1999 | Geen | 73/504.12 |
| 5,939,633 A | 8/1999 | Judy | 73/514.32 |
| 5,969,225 A | 10/1999 | Kobayashi | 73/1.37 |
| 5,992,233 A | 11/1999 | Clark | 73/514.35 |
| 6,032,531 A | 3/2000 | Roszhart | 73/504.04 |
| 6,122,961 A | 9/2000 | Geen et al. | 73/504.12 |
| 6,205,838 B1 | 3/2001 | Schmid et al. | 73/1.37 |

(Continued)

FOREIGN PATENT DOCUMENTS

| | | | |
|---|---|---|---|
| EP | 1733468 | 3/2009 | H02N 1/00 |
| FR | 2849183 | 6/2004 | G01C 19/56 |

(Continued)

OTHER PUBLICATIONS

Geen et al., "Single-Chip Surface Micromachined Integrated Gyroscope with 50°/h Allan Deviation," IEEE Journal of Solid-State Circuits, vol. 37, No. 12, pp. 1860-1866, Dec. 2002.

(Continued)

*Primary Examiner* — Hezron E Williams
*Assistant Examiner* — Xin Zhong
(74) *Attorney, Agent, or Firm* — Sunstein Kann Murphy & Timbers LLP

(57) ABSTRACT

In comb drive vibratory gyroscopes, drive-induced Coriolis accelerometer offset is effectively canceled by demodulating the output during equal times of in-phase and anti-phase drive of the shuttle with respect to the velocity signal used for angular rate demodulation. This reduces or eliminates the corresponding thermal and die-stress effects otherwise needing calibration.

61 Claims, 12 Drawing Sheets

(56) References Cited

U.S. PATENT DOCUMENTS

| | | | |
|---|---|---|---|
| 6,370,954 B1 | 4/2002 | Zerbini et al. | 73/514.01 |
| 6,470,748 B1 | 10/2002 | Geen | 73/504.12 |
| 6,505,511 B1 | 1/2003 | Geen et al. | 73/504.12 |
| 6,553,833 B1 | 4/2003 | Funk et al. | 73/504.14 |
| 6,564,637 B1 | 5/2003 | Schalk et al. | 73/504.12 |
| 6,654,424 B1 | 11/2003 | Thomae et al. | 375/257 |
| 6,718,823 B2 | 4/2004 | Platt | 73/504.12 |
| 6,742,389 B2 | 6/2004 | Nguyen et al. | 73/504.12 |
| 6,768,196 B2 | 7/2004 | Harney et al. | 257/729 |
| 6,837,107 B2 | 1/2005 | Geen | 73/504.04 |
| 6,877,374 B2 | 4/2005 | Geen | 73/504.14 |
| 6,883,361 B2 | 4/2005 | Wyse | 73/1.38 |
| 6,892,576 B2 | 5/2005 | Samuels et al. | 73/514.32 |
| 7,032,451 B2 | 4/2006 | Geen | 73/504.14 |
| 7,036,373 B2 | 5/2006 | Johnson et al. | 73/504.14 |
| 7,051,590 B1 | 5/2006 | Lemkin et al. | 73/504.04 |
| 7,159,461 B2 | 1/2007 | Gallon et al. | 73/504.12 |
| 7,246,512 B2 | 7/2007 | Schroeder | 73/1.77 |
| 7,396,476 B2 | 7/2008 | Ridley et al. | 216/2 |
| 7,421,897 B2 | 9/2008 | Geen et al. | 73/504.12 |
| 7,461,552 B2 | 12/2008 | Acar | 73/504.04 |
| 7,565,839 B2 | 7/2009 | Stewart et al. | |
| 7,640,803 B1 | 1/2010 | Gutierrez et al. | 73/504.04 |
| 7,739,896 B2 | 6/2010 | Stewart | |
| 7,874,209 B2 | 1/2011 | Stewart | |
| 7,886,598 B2 | 2/2011 | Wyse et al. | |
| 7,984,648 B2 | 7/2011 | Horning et al. | 73/504.12 |
| 8,011,246 B2 | 9/2011 | Stewart | |
| 8,151,641 B2 | 4/2012 | Geen | 73/504.12 |
| 8,561,466 B2 | 10/2013 | Wyse et al. | |
| 8,616,055 B2 | 12/2013 | Geen | 73/504.12 |
| 2004/0211257 A1 | 10/2004 | Geen | 73/504.04 |
| 2005/0081633 A1 | 4/2005 | Nasiri et al. | 73/514.29 |
| 2005/0205959 A1 | 9/2005 | Chau et al. | 257/467 |
| 2006/0021433 A1 | 2/2006 | Willig et al. | 73/504.02 |
| 2006/0150745 A1 | 7/2006 | Lang | 73/849 |
| 2006/0201233 A1 | 9/2006 | Schroeder | 73/1.77 |
| 2007/0220971 A1 | 9/2007 | Ayazi et al. | 73/504.02 |
| 2008/0053224 A1 | 3/2008 | Tsuji et al. | 73/504.12 |
| 2008/0282833 A1 | 11/2008 | Chaumet | 74/5 R |
| 2009/0188317 A1 | 7/2009 | Aigner | 73/504.01 |
| 2011/0030474 A1 | 2/2011 | Kuang et al. | 73/504.16 |
| 2011/0041609 A1 | 2/2011 | Clark et al. | 73/514.29 |
| 2011/0167891 A1 | 7/2011 | Geen | 73/1.38 |
| 2011/0270569 A1 | 11/2011 | Stephanou et al. | 702/141 |

FOREIGN PATENT DOCUMENTS

| | | | | |
|---|---|---|---|---|
| JP | 10-103960 | 4/1998 | | G01C 19/56 |
| JP | 2006-514749 | 5/2006 | | G01C 19/56 |
| JP | 2007-205975 | 8/2007 | | G01C 19/56 |

OTHER PUBLICATIONS

Geen et al., "New iMEMS® Angular—Rate—Sensing Gyroscope," Analog Dialogue 37-03, pp. 1-4, 2003.

Saukoski, "System and Circuit Design for a Capacitive MEMS Gyroscope," Doctoral Dissertation, TKK Dissertations 116, Helsinki University of Technology, 279 pages, 2008.

European Patent Office, European Search Report—Application No. 13163371.1-1557/2657648, dated Aug. 24, 2015, 7 pages.

ial gyro ADXRS453) or by stabilizing the velocity of the
MEMS GYROSCOPES WITH REDUCED ERRORS

FIELD OF THE INVENTION

The present invention relates generally to MEMS gyroscopes, and, more particularly, to MEMS gyroscope structure and circuitry to reduce null bias errors and increase sensitivity in order to reduce or eliminate the need for calibration for many gyroscope applications.

BACKGROUND OF THE INVENTION

Micromachined (MEMS) gyroscopes have become established as useful commercial items. Generally speaking, a MEMS gyroscope incorporates two high-performing MEMS devices, specifically a self-tuned resonator in the drive axis and a micro-acceleration sensor in the sensing axis. Gyroscope performance is very sensitive to such things as manufacturing variations, errors in packaging, driving, linear acceleration, and temperature, among other things. Basic principles of operation of angular-rate sensing gyroscopes are well understood and described in the prior art (e.g., Geen, J. et al., *New iMEMS Angular-Rate-Sensing Gyroscope*, Analog Devices, Inc., Analog Dialog 37-03 (2003), available at http://www.analog.com/library/analogDialogue/archives/37-03/gyro.html, which is hereby incorporated herein by reference in its entirety).

The principles of vibratory sensing angular rate gyroscopes with discrete masses are long-established (see, for example, Lyman, U.S. Pat. No. 2,309,853 and Lyman, U.S. Pat. No. 2,513,340, each of which is hereby incorporated herein by reference in its entirety). Generally speaking, a vibratory rate gyroscope works by oscillating a proof mass (also referred to herein as a "shuttle" or "resonator"). The oscillation is generated with a periodic force applied to a spring-mass-damper system at the resonant frequency. Operating at resonance allows the oscillation amplitude to be large relative to the force applied. When the gyroscope is rotated, Coriolis acceleration is generated on the oscillating proof mass in a direction orthogonal to both the driven oscillation and the rotation. The magnitude of Coriolis acceleration is proportional to both the velocity of the oscillating proof mass and the rotation rate. The resulting Coriolis acceleration can be measured by sensing the deflections of the proof mass. The electrical and mechanical structures used to sense such deflections of the proof mass are referred to generally as the accelerometer.

Many MEMS gyroscopes employ balanced comb drives of the type described generally in Tang, U.S. Pat. No. 5,025,346, which is hereby incorporated herein by reference in its entirety. General use of a micromachined layer above a semiconductor substrate with Coriolis sensing perpendicular to that substrate is described generally in Zabler, U.S. Pat. No. 5,275,047, which is hereby incorporated herein by reference in its entirety. Exemplary MEMS gyroscopes are described in Bernstein, U.S. Pat. No. 5,349,855; Dunn, U.S. Pat. No. 5,359,893; Geen, U.S. Pat. No. 5,635,640; Geen, U.S. Pat. No. 5,869,760; Zerbini, U.S. Pat. No. 6,370,954; and Geen U.S. Pat. No. 6,837,107, each of which is hereby incorporated herein by reference in its entirety. The latter four patents employ rotationally vibrated mass(es).

Micromachined gyroscopes using comb drives are extensively used in many applications, such as for automotive safety, camera stabilization, gesture-based controllers and many other low-cost applications. Typically, such micromachined gyroscopes include one or more resonant masses (which may be referred to as shuttles or dither resonators) that may be configured to resonate in a vibratory mode, such as in a linear (back-and-forth) vibratory mode or a rotational vibratory mode. Each shuttle is typically driven by oppositely-acting sets of comb drives, where one set of comb drives is used to pull the shuttle in one direction and the other set of comb drives is used to pull the shuttle in the other direction. An alternating drive signal is applied to the sets of shuttles to alternately pull the shuttle in one direction and then the other direction, and so forth, until the shuttle reaches a desired equilibrium. In micromachined gyroscopes that have multiple shuttles, the shuttles may be mechanically or electrically coupled to resonate substantially in synchronization with one another.

A major element in the cost of manufacture of such gyroscopes is measurement and correction of both sensitivity to angular rate and output in the absence of angular rate (null bias), especially as functions of temperature. Specifically, gyroscopes are typically calibrated as part of the manufacturing process to address the following manufacturing tolerance issues, which are particularly troublesome with linearly vibrated gyroscopes:

a) Variability of critical dimensions (CD) within a structure causes mismatch of shuttle frequencies and is the primary cause of Q variation and consequently rate sensitivity error. It also limits the useable capping pressure, which in turn limits the noise that can be achieved as reasonable yield.

b) Variability of fill gas pressure and composition during capping also causes variation in Q and variation of sensitivity with temperature. It interacts with (a) in a complex way.

c) Variability of CD within a structure causes mismatch of drive finger lateral forces, which is a major cause of null bias error.

d) In the presence of an effective quadrature servo, the main cause of null variability with packaging, user mounting and temperature is die stress which also mismatches lateral drive gaps.

Calibration typically involves characterizing output signals from the gyroscope in response to various controlled physical movements imparted to the gyroscope across a range of temperatures. Such calibration is time-consuming and complex, and requires specialized calibration equipment. Thus, calibration is major cost contributor.

In addition to calibration and the costs associated with calibration, gyroscopes often include structural and electronic components that are used to mitigate null bias and angular rate sensitivity errors (e.g., trim electrodes and related circuitry), and these components can add cost and complexity to the gyroscope.

For example, variation of sensitivity with Q against temperature can be achieved open-loop (as, for example, described by Geen et al., Single-Chip Surface Micromachined Integrated Gyroscope With 50°/h Allan Deviation, IEEE Journal of Solid-State Circuits, Vol. 37, No. 12, pp. 1860-1866, December 2002, which is hereby incorporated herein by reference in its entirety) or by sensing the velocity of the shuttle as a compensating variable (as in the commercial gyro ADXRS453) or by stabilizing the velocity of the shuttle with control of the drive. This last technique has been used since the earliest vibratory gyroscopes (for example, Meredith, U.S. Pat. No. 2,455,939, which is hereby incorporated herein by reference in its entirety, e.g., FIG. 5B and col.7 line 50) and continues to attract refined modern implementations (for example, Platt, U.S. Pat. No. 6,718,823, which is hereby incorporated herein by reference in its entirety). However, none of these devolve the absolute sensitivity from a plethora of electronics gains, and therefore calibration is still needed.

The absolute sensitivity can be freed of electronics gain and realized as a function of Q only, using the methods disclosed in U.S. Pat. No. 6,470,748, which is hereby incorporated herein by reference in its entirety. However, temperature variation still needs compensation.

Thermal and mounting variation of null bias can be mitigated using a variety of methods for mechanically isolating the die (as for example, described by Harney et al., U.S. Pat. No. 6,768,196), but these involve additional fabrication and packaging expense.

The lateral drive force can be discerned separately from Coriolis force by modulating the drive, filtering the modulation from the Coriolis signal and nulling it with a servomechanism and electro-mechanical actuator as explained in US patent application publication 2011/0041609, which is hereby incorporated herein by reference in its entirety. However, the filters required are dependent on Q, which makes them difficult to implement in practice without adversely affecting dynamic errors or incurring some calibration technique.

SUMMARY OF EXEMPLARY EMBODIMENTS

In one embodiment, a method of reducing drive-induced Coriolis accelerometer offset in a comb-drive vibratory gyroscope having a shuttle and a Coriolis accelerometer involves driving vibratory motion of the shuttle using a drive signal having alternating phase and anti-phase drive signal periods and demodulating output of the Coriolis accelerometer during equal times of phase and anti-phase drive of the shuttle with respect to the velocity signal used for angular rate demodulation.

In another embodiment, a gyroscope includes a first shuttle, a first shuttle driver, a Coriolis accelerometer, and a demodulator, wherein the first shuttle driver is configured to drive vibratory motion of the first shuttle using a first drive signal having alternating phase and anti-phase drive signal periods, and wherein the demodulator is configured to demodulate output of the Coriolis accelerometer during equal times of phase and anti-phase drive of the first shuttle with respect to the velocity signal used for angular rate demodulation.

In various alternative embodiments of the above method and gyroscope, the phase and anti-phase drive signal periods may be equal periods of time (e.g., defined as a predetermined number of shuttle cycles, where the drive signal is applied such that the amplitude of the shuttle oscillation is continually ramping without reaching a theoretical maximum shuttle amplitude) or may be unequal periods of time, and the equal times of phase and anti-phase drive of the shuttle during which the output of the Coriolis accelerometer is demodulated may be centered at the transitions from the phase drive signal period to the anti-phase drive signal period. Additionally or alternatively, the drive signal may be applied such that the amplitude of the shuttle oscillation does not cross zero during steady state operation or may be applied such that the amplitude of the shuttle oscillation periodically crosses zero during steady state operation. Additionally or alternatively, the Coriolis accelerometer output may be demodulated continually or may be demodulated only during intervals about the points of greatest shuttle amplitude with blanking between such intervals to discard low amplitude signals and equalize effective up and down periods of demodulation. Particularly in embodiments where the shuttle is driven through periods of little or no amplitude/velocity, phase coherency of the shuttle drive may be maintained, for example, using a phase-locked loop or using phase information from a second gyroscope operating in anti-phase. Thus, embodiments may include multiple interoperating gyroscopes.

Additional embodiments may be disclosed and claimed.

BRIEF DESCRIPTION OF THE DRAWINGS

The foregoing and advantages of the invention will be appreciated more fully from the following further description thereof with reference to the accompanying drawings wherein.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
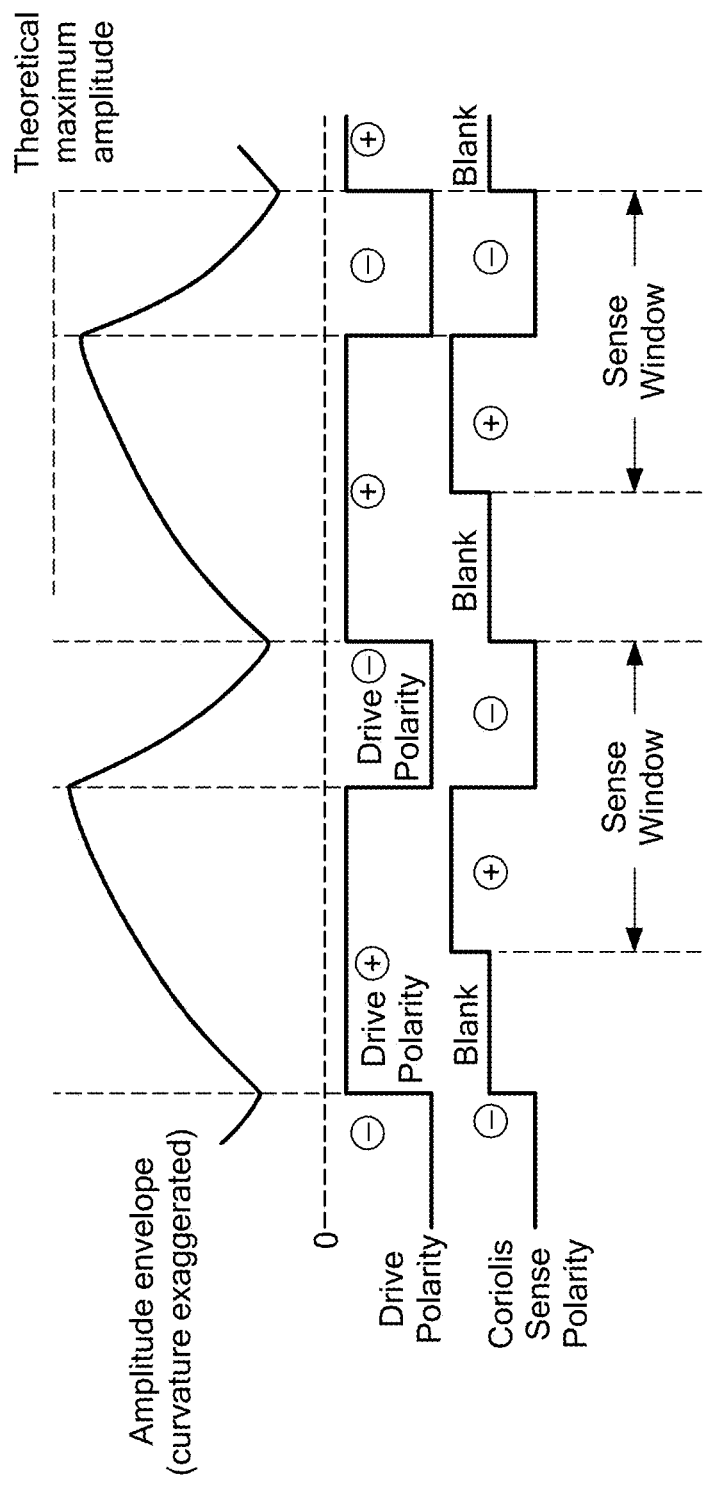
FIG. 1 schematically shows the amplitude envelope, drive polarity, sense polarity, and Coriolis sense window relationships for a first exemplary embodiment.

Definitions. As used in this description and the accompanying claims, the following terms shall have the meanings indicated, unless the context otherwise requires.

A "set" includes one or more elements.

An "electrode" is a structure through which an electrical or electromechanical effect is applied and/or sensed. In exemplary embodiments, various electrodes are used for applying and/or sensing electrical or electromechanical effects through capacitive coupling, although it should be noted that other types of electrodes and couplings may be used (e.g., piezoelectric).

The term "quality factor" or "Q-factor" or simply "Q" denotes a dimensionless parameter that compares the time constant for decay of an oscillating physical system's amplitude to its oscillation period. Equivalently, it compares the frequency at which a system oscillates to the rate at which it dissipates its energy. A higher Q indicates a lower rate of energy dissipation relative to the oscillation frequency, so the oscillations die out more slowly. A system with a high Q resonates with a greater amplitude (at the resonant frequency) than one with a low Q factor, and its response falls off more rapidly as the frequency moves away from resonance.

The term "$f_0$" may be used as a shorthand to refer to the resonance frequency of the resonator.

The "mode" of a resonating body is the shape of motion of the body at resonance.

As discussed above, a major element in the cost of manufacture of micromachined gyroscopes is measurement and correction of both sensitivity to angular rate and output in the absence of angular rate (null bias), especially as functions of temperature. Expensive calibration techniques, and in some cases special structural and electronic components, are often used to characterize and mitigate such errors.

Embodiments of the present invention employ novel shuttle drive and acceleration (e.g., Coriolis) sense techniques that reduce sensitivity and/or null bias errors to acceptable levels for many applications without requiring the types of calibration techniques and special structural and electronic components discussed above. Specifically, the shuttle is driven with a drive signal that alternates between a phase signal for a first given time period and a reversed-phase (anti-phase) signal for second given time period. Among other things, reversing the phase of the drive signal helps to cancel out dominant errors in the null (i.e., reversing phase changes the sign of the error term). Coriolis sensing/demodulation is performed for substantially equal times of the phase and anti-phase time periods, which in some embodiments covers the entire phase and anti-phase time periods while in other embodiments covers only a portion of the phase and/or anti-phase periods.

Typically, the shuttle is driven to less than its potential maximum amplitude so as to keep resonance of the shuttle within the shuttle's substantially linear range of response to drive duration. Among other things, driving the shuttle to less than its potential maximum amplitude helps to control the scale factor of the gyroscope.

In some embodiments, the phase and reversed-phase periods are substantially equal while in other embodiments the phase and reversed-phase time periods are unequal (e.g., the reversed-phase period may be shorter in duration than the phase period). In some embodiments, the shuttle is driven such that the shuttle's amplitude never reaches zero during steady-state operation (e.g., driving the shuttle during a steady state such that the amplitude increases during the phase period and decreases during the reversed-phase period without reaching zero) while in other embodiments the shuttle is driven such that the shuttle's amplitude periodically crosses zero (e.g., driving the shuttle for equal phase and reversed-phase periods).

Importantly, these novel shuttle drive and acceleration sense techniques can be applied to many existing MEMS gyroscope configurations (e.g., by replacing or modifying existing drive and sense circuitry) such that physical redesign of the gyroscope is not needed in many cases. It should be noted that these shuttle drive and acceleration sense techniques can be used in gyroscopes having a single shuttle or multiple shuttles. In embodiments that include multiple shuttles, two or more shuttles may be mechanically or electrically coupled so as to operate at single resonance frequency.

Some exemplary embodiments are discussed below, and these exemplary embodiments demonstrate various improvements for reducing sensitivity and/or null bias errors.

For example, in certain embodiments, the cancellation of drive-induced Coriolis accelerometer offset in comb drive vibratory gyroscopes is accomplished by demodulating the output during equal times of in-phase and anti-phase drive of the shuttle with respect to the velocity signal used for angular rate demodulation. This eliminates the corresponding thermal and die-stress effects otherwise needing calibration. The demodulation does not need to be done continuously, although it may in some embodiments.

In other embodiments, stabilization of effective shuttle velocity in the presence of ill-defined mechanical Q is accomplished by using defined numbers of shuttle cycles, continually ramping the amplitude of shuttle oscillation (i.e., without the amplitude of shuttle oscillation reaching the theoretical maximum amplitude of the shuttle so as to keep the amplitude of the shuttle within the substantially linear portion of its response to drive duration). This enables accurate definition of sensitivity without calibration using mechanical rotations.

In still other embodiments, equal or unequal drive-up and drive-down periods is used in conjunction with blanking to discard low amplitude signals and equalize the effective up and down periods of demodulation. This helps to optimize noise performance.

In yet other embodiments, a PLL or other mechanism is used to maintain the phase coherency of an amplitude modulated shuttle drive when the corresponding velocity feedback is small. This keeps the system running smoothly.

In still other embodiments, multiple gyroscopes are used to maintain phase coherency while amplitude modulating shuttle motion. These gyroscopes can be arranged to be mutually-supporting in order to improve the SNR and bandwidth of the system.

Various alternative embodiments may incorporate one or more of the above schemes, such as, for example, using non-continuous Coriolis demodulation with blanking in combination with fixed numbers of phase and anti-phase shuttle cycles using either a PLL or multiple gyroscopes to maintain phase coherency.

Exemplary Embodiment 1

In one exemplary embodiment, during steady state operation (i.e., after initial startup of the shuttle resonance), the shuttle is driven using alternating phase (+) and anti-phase (−) drive signals such that the shuttle's amplitude (which is continually ramping up and down) increases during the phase period and decreases during the anti-phase period without reaching zero and also without reaching the theoretical maximum shuttle amplitude. Also, provided the Coriolis demodulation is co-phased with the shuttle velocity feedback, the error from drive gap mismatch is effectively reversed for half the time and effectively cancels out.

FIG. 1 schematically shows the amplitude envelope, drive polarity, sense polarity, and Coriolis sense window relationships for a first exemplary embodiment. In this exemplary embodiment, during steady state operation (i.e., after initial startup of the shuttle resonance), the shuttle is driven using alternating phase (+) and anti-phase (−) drive signals such that the shuttle's amplitude increases during the phase period and decreases during the anti-phase period without reaching zero. Because the shuttle amplitude will generally decrease faster than it will increase, the phase and anti-phase time periods in this example are unequal, with the anti-phase period shorter in duration than the phase period, although in other embodiments the phase and anti-phase time periods may be equal. The Coriolis sense signals are demodulated during successive sense windows that include substantially equal times of the phase (+) and anti-phase (−) time periods and are separated by "blank" intervals during which Coriolis sensing is not performed (although the drive and/or sense signals may be used for other purposes during the blank intervals, such as for obtaining quadrature information). In this example, the sense windows are centered about the transition from the phase signal to the anti-phase signal (i.e., as the shuttle approaches and recedes from its maximum amplitude) while the blank interface follows the transition from the anti-phase signal to the phase signal (i.e., as the shuttle is ramping up from its smallest amplitude). Among other things, ramping up the shuttle amplitude for a longer time than ramping down the shuttle amplitude but sensing the Coriolis accelerometer response for equal times of ramp-up and ramp-down during which the amplitude is large tends to avoid the degradation of SNR at low amplitudes and, by never letting the amplitude near zero, avoids potential phase ambiguity. Also, it can be implemented without a mechanism such as a PLL to smoothly maintain the shuttle motion (various alternative techniques discussed below utilize such a mechanism), since the amplitude of the velocity signal used to generate the shuttle drive signal remains sufficiently high to maintain the phase of the drive signal.

Figure 2:
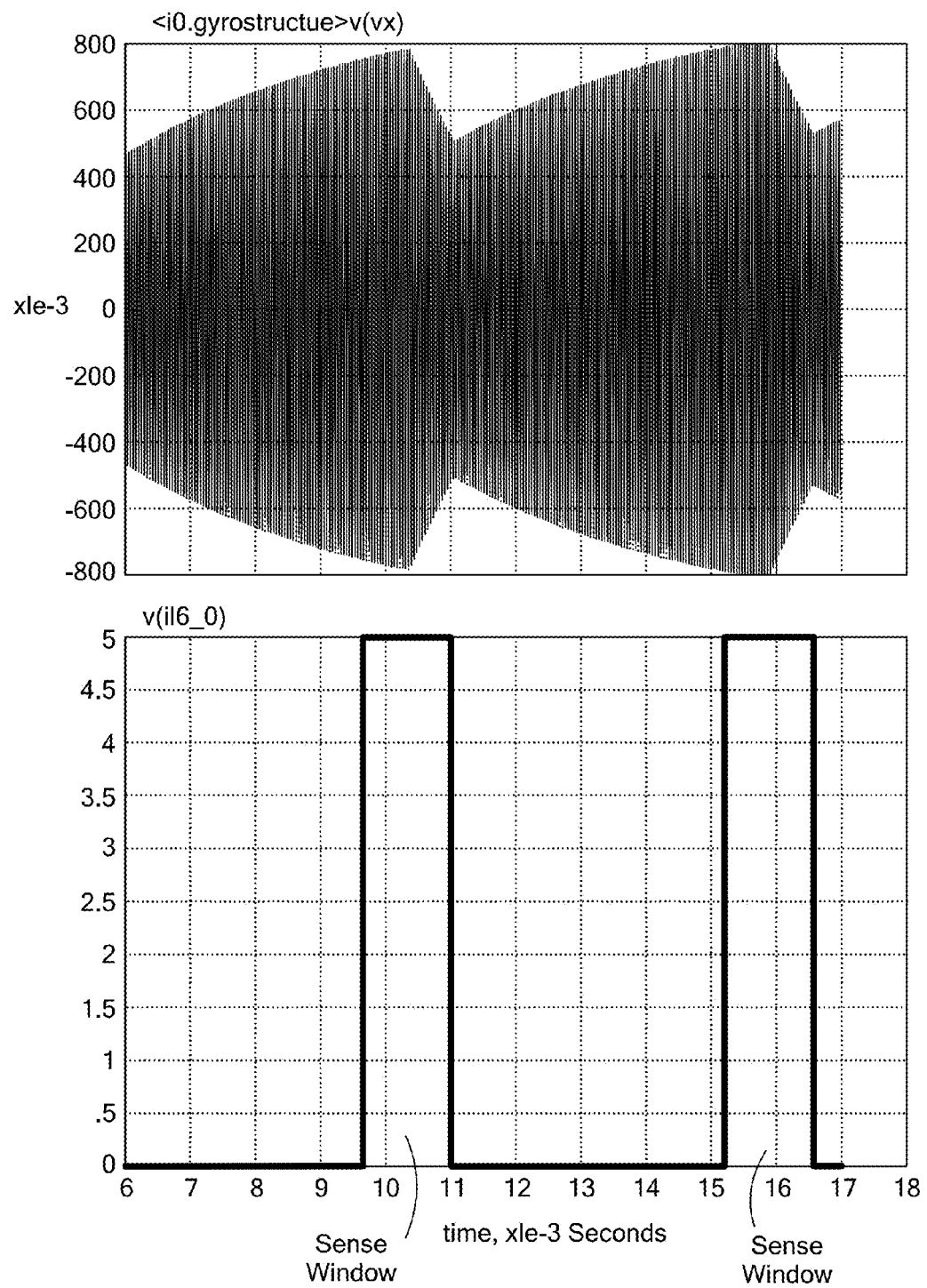
FIG. 2 schematically shows the amplitude envelope and sense windows for a particular test implementation of the shuttle drive and Coriolis sense technique discussed with reference to FIG. 1.

FIG. 2 schematically shows the amplitude envelope and sense windows for a particular test implementation of the shuttle drive and Coriolis sense technique discussed with reference to FIG. 1. Implementationally, the drive circuit can be implemented to include a divide-by-N counter (or counters) that can be used to alternately provide $N_1$ cycles of the phase (+) signal followed by $N_2$ cycles of the anti-phase (−) signal, where $N_1$ and $N_2$ are predetermined numbers of cycles and $N_2$ is generally less than $N_1$.

Figure 3:
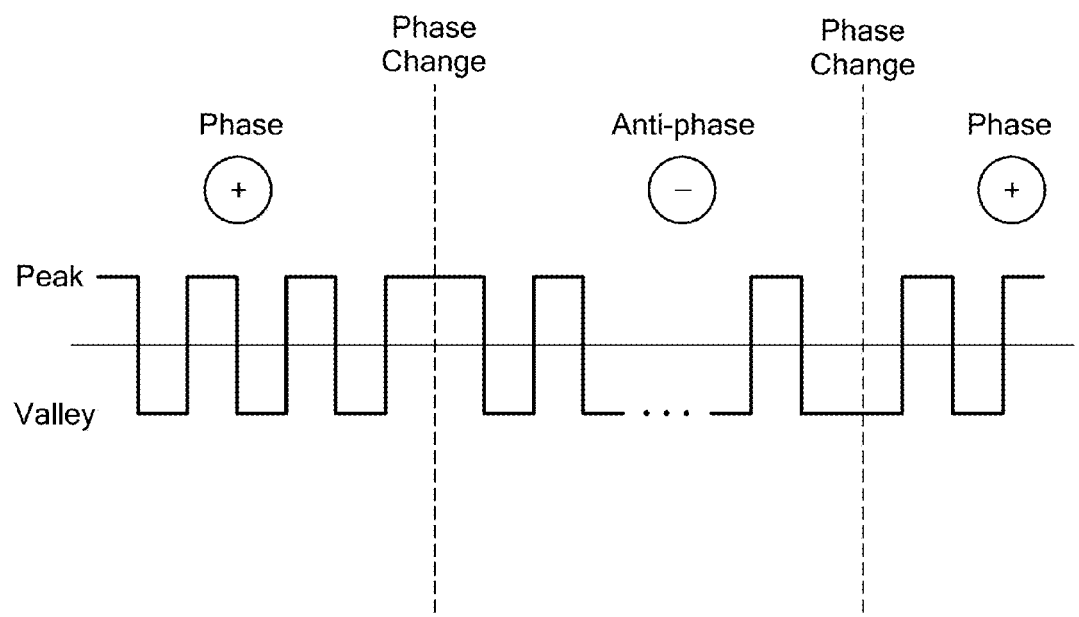
FIG. 3 shows a schematic representation of an alternating drive signal with phase changes, applied to oppositely-acting sets of comb drives, with the peaks representing periods of voltage applied to one set and the valleys representing periods of voltage applied to the other set.

FIG. 3 shows a schematic representation of an alternating drive signal with phase changes, applied to oppositely-acting sets of comb drives, with the peaks representing periods of voltage applied to one set and the valleys representing periods of voltage applied to the other set. In this example, the phase changes are shown as occurring at the peaks and valleys, although the phase changes may be implemented in other ways.

Figure 4:
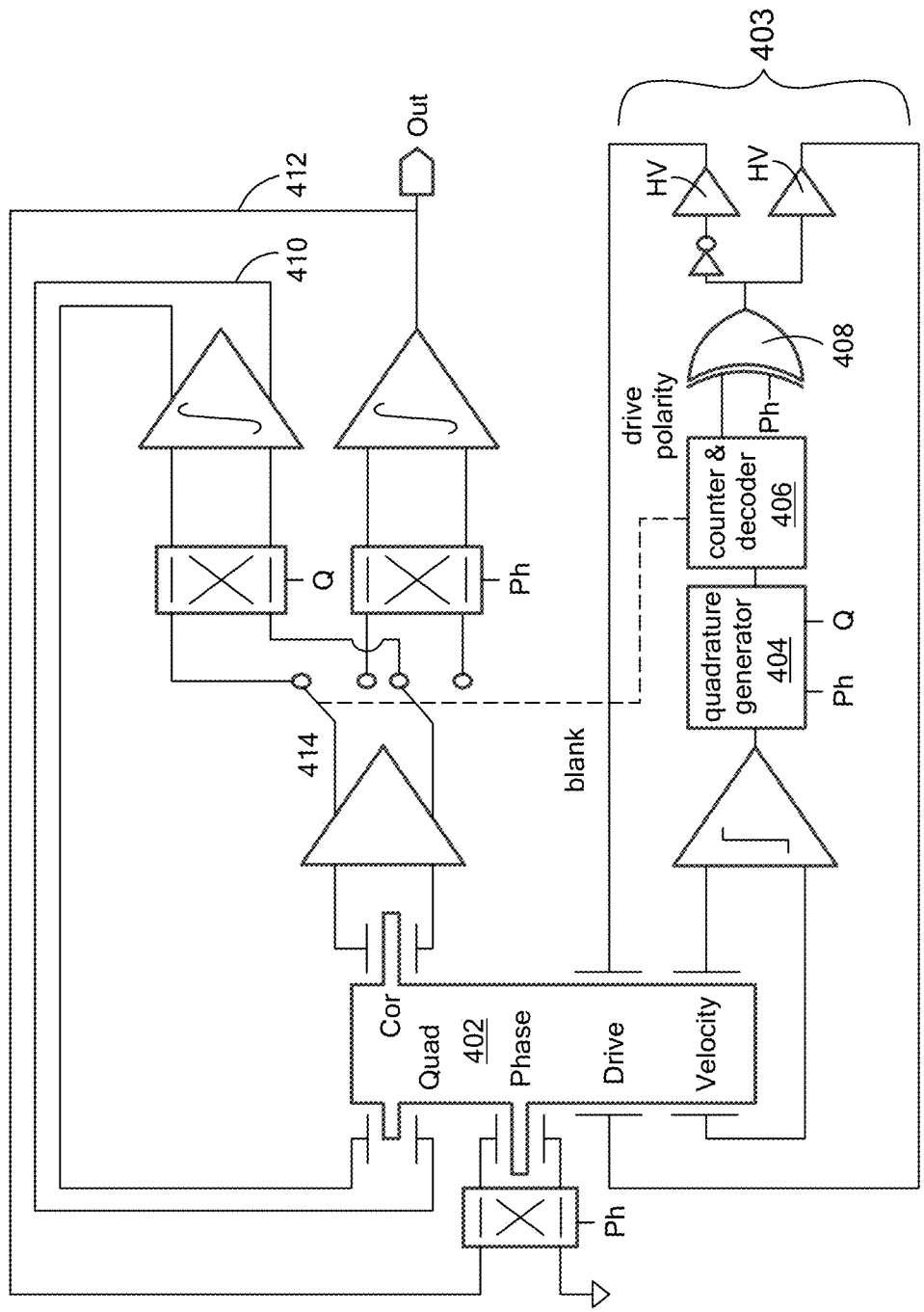
FIG. 4 is a schematic block diagram of a drive circuit in accordance with the exemplary embodiment described with reference to FIGS. 1-3.

FIG. 4 is a schematic block diagram of a drive circuit in accordance with the exemplary embodiment described with reference to FIGS. 1-3. Among other things, the drive circuit 403 for gyroscope 402 includes a quadrature generator 404 that generates the quadrature (Q) and in-phase (Ph) signals based on the velocity signals from the gyroscope 402, a counter 406 that controls the drive polarity transitions, and an XOR gate 408 that generates the drive signal as a function of the in-phase (Ph) signal and the drive polarity from the counter 406. Thus, for example, the output of the counter 406 (designated in the drawing as "drive polarity") alternately provide $N_1$ cycles of the phase (+) signal followed by $N_2$ cycles of the anti-phase (−) signal, as discussed above. The circuit may be configured to provide equal or unequal numbers of phase and anti-phase cycles as necessary or desirable for a given application.

Also shown in FIG. 4 are optional quadrature and phase compensation feedback loops 410 and 412, respectively, with, in this example, the Coriolis signal diverted for quadrature feedback via switching logic 414 while the Coriolis signal is not be used for output generation. Among other things, such "sharing" of the Coriolis signal between the output generator and the quadrature feedback is a useful saving of circuit elements when current switching is used for the demodulators (which in this example are implemented as cross switches). It should be noted that the in-phase feedback alternatively may be implemented differentially, or not at all. The quadrature feedback also may be omitted or implemented in other ways, such as using a fixed trim mechanism.

It should be noted that the shuttle drive and Coriolis sense technique discussed with reference to FIGS. 1-4 substantially cancels null bias and provides good SNR while substantially eliminating the corresponding thermal and die-stress effects that otherwise need calibration, although the angular rate sensitivity is still dependent on mechanical Q (various alternative techniques are discussed below that are not Q dependent). Thus, it is expected that such a shuttle drive and Coriolis sense technique can be employed to reduce or eliminate the need for calibration in many gyroscope applications, such as certain gesture sensing applications.

Exemplary Embodiment 2

In another exemplary embodiment, the shuttle is alternately driven with a phase (+) signal for a fixed number of cycles to build the resonant motion through the essentially linear initial portion of its exponential growth and then driven with an anti-phase (−) signal for the same number of cycles to cancel that motion. In this exemplary embodiment, the amplitude of the shuttle motion periodically crosses zero. The use of equal numbers of phase and anti-phase cycles to continually ramp the amplitude of the shuttle oscillation effectively defines the shuttle Q. For example, if the drive is supplied for a duration N times the shuttle period, then the effective Q becomes $\pi N/2$ averaged over that duration, provided the equilibrium Q is sufficiently greater than N. Since the output (sense) signal produced by the gyroscope is based on Q, this ability to define Q eliminates the need to measure Q. Thus, very low pressure, otherwise unusable because of frequency split, actually becomes an advantage. Also, provided the Coriolis demodulation is co-phased with the shuttle velocity feedback, the error from drive gap mismatch is effectively reversed for half the time and effectively cancels out.

Figure 5:
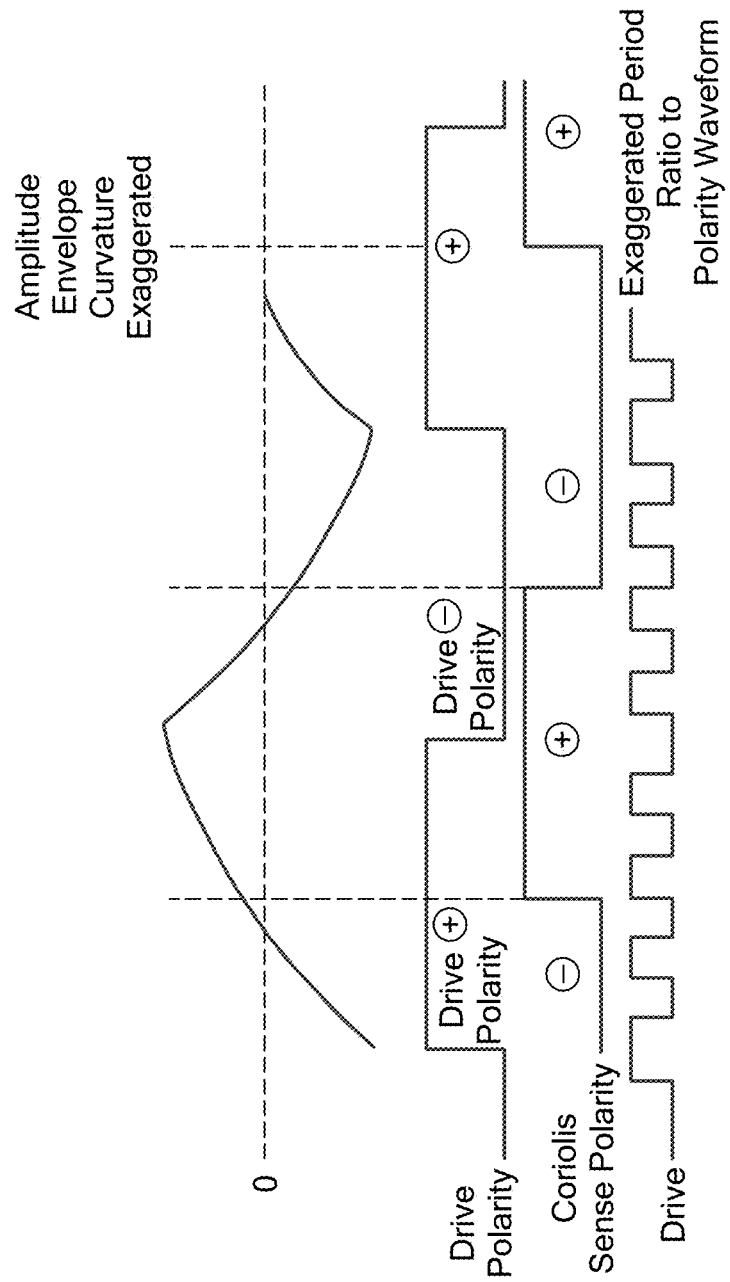
FIG. 5 schematically shows the amplitude envelope, drive polarity, sense polarity, and Coriolis sense window relationships for a second exemplary embodiment.

FIG. 5 schematically shows the amplitude envelope, drive polarity, sense polarity, and Coriolis sense window relationships for a second exemplary embodiment. In this exemplary embodiment, it is presumed that the gyroscope shuttle has or is made to have a Q that is greater than that needed to reach the required amplitude with the available drive voltage, although Q may be poorly defined. The shuttle is alternately driven with a phase (+) signal for a fixed number of cycles to build the resonant motion through the essentially linear initial portion of its exponential growth and then driven with an anti-phase (−) signal for the same number of cycles to cancel that motion. Repeating this sequence results in an average motion that is well-defined and repeatable (i.e., the finite Q of the shuttle results in the ramps gradually centering on zero), even though the actual Q of the shuttle is not well-defined, e.g., due to the dependence of Q on such things as resonator frequency mismatch, gas pressure, or temperature. Also, the lateral forces, which are a primary cause of null bias errors in the comb-drive gyroscope, are reversed for half the time with respect to the Coriolis force and thereby substantially cancel. Thus, the variation of those forces with die dispersion from temperature and mounting are also substantially cancelled.

Changes that increase the Q of the shuttle also typically increase the Coriolis accelerometer Q and hence reduce gyroscope noise.

In this exemplary embodiment, Coriolis sensing is performed continuously, alternating between phase and anti-phase Coriolis sense polarities with no blank intervals. In alternative embodiments, however, blank intervals may be included, e.g., to avoid periods of lower SNR (e.g., when the amplitude of the shuttle is small).

In essence, the shuttle drive and Coriolis sense technique discussed with reference to FIG. 5 defines effective shuttle Q and cancels the effect of drive gap mismatch, specifically by periodically reversing the drive phase at a sub-multiple of the shuttle frequency. Implementationally, the drive circuit can be implemented to include a divide-by-N counter that alternately provides N cycles of the phase (+) signal followed by N cycles of the anti-phase (−) signal, where N is a predetermined numbers of cycles. If the drive is supplied for a duration N times the shuttle period, then the effective Q becomes $\pi N/2$, averaged over that duration, provided the equilibrium Q is sufficiently greater than N. Thus, very low pressure, otherwise unusable because of frequency split, becomes an advantage. Also, provided the Coriolis demodulation is co-phased with shuttle velocity feedback, the error from drive gap mismatch is reversed for half the time and substantially cancels out.

When amplitude of shuttle motion is very small, the SNR becomes poor and the phase of the effective velocity signal can become incoherent. This can result in noisy Coriolis demodulation and in some cases can even result in stoppage of the shuttle oscillation. Thus, because of the finite equilibrium Q and the need to maintain phase coherency when the shuttle amplitude is small, the drive circuit typically also includes a mechanism such as a PLL to smoothly maintain the shuttle motion through the transitions through the low-amplitude regions.

Figure 6:
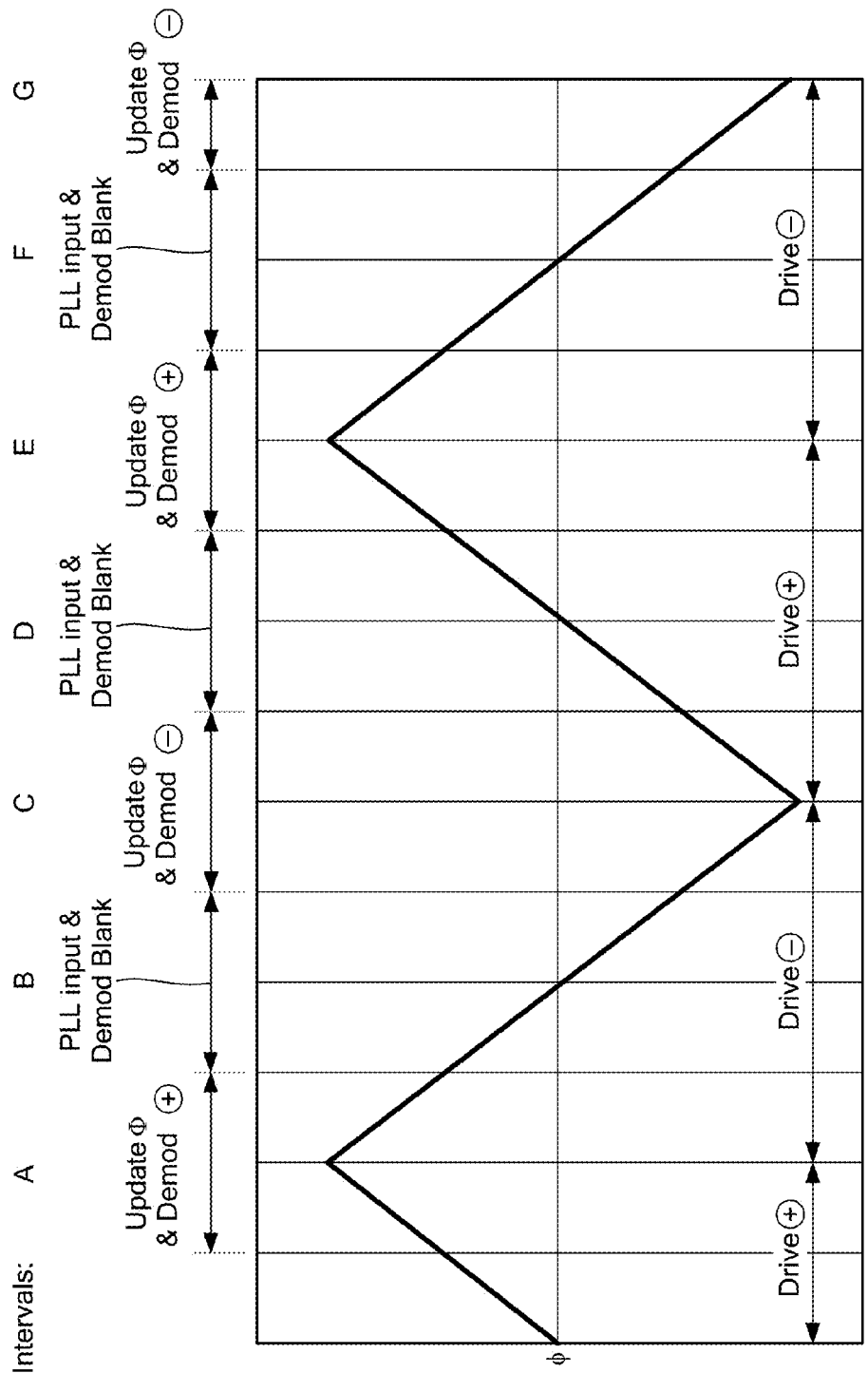
FIG. 6 schematically shows the amplitude and drive profiles for an exemplary phase-locked loop (PLL) implementation of the embodiment represented in FIG. 5

FIG. 6 schematically shows the amplitude and drive profiles for an exemplary PLL implementation. Here, the equal periods of alternating drive polarities cause the shuttle amplitude to periodically cross the zero point (represented in the figure where the plot crosses the zero line). At and around these zero points, there is little or no signal (i.e., there is a low signal-to-noise ratio). Thus, as represented in the figure, Coriolis sensing/demodulation may be done only about the points of greatest shuttle amplitude (i.e., intervals A, C, E, G, etc.), with blank periods about the points of lowest shuttle amplitude (i.e., intervals B, D, F, etc.). Such blanking effectively discards low amplitude signals and equalizes the effective up and down periods of demodulation, which tends to improve noise performance. The Coriolis sensing/demodulation is based on the corresponding drive signal polarity, i.e., (+) polarity during interval A, (−) polarity during interval C, etc.

Gyroscope electronics often include a phase-lock-loop oscillator, and in many cases this existing PLL oscillator may be exploited. If the time constant of the oscillator control in the PLL (phase-lock-loop) is made long compared with the shuttle amplitude ramp duration and the drive is taken from the PLL, then the PLL will carry the shuttle amplitude smoothly through zero without phase discontinuity. Similarly, the Coriolis demodulation will remain coherent if taken from the PLL. In practice, the SNR can be markedly improved by blanking both the phase input updating of the PLL and the Coriolis demodulation around the region of low shuttle amplitude. Theoretically, the best SNR comes from blanking ⅓ of the total time, but in practice, there should be only a small difference in SNR if the blanking is either ½ or ¼ of the time or thereabouts.

Figure 7:
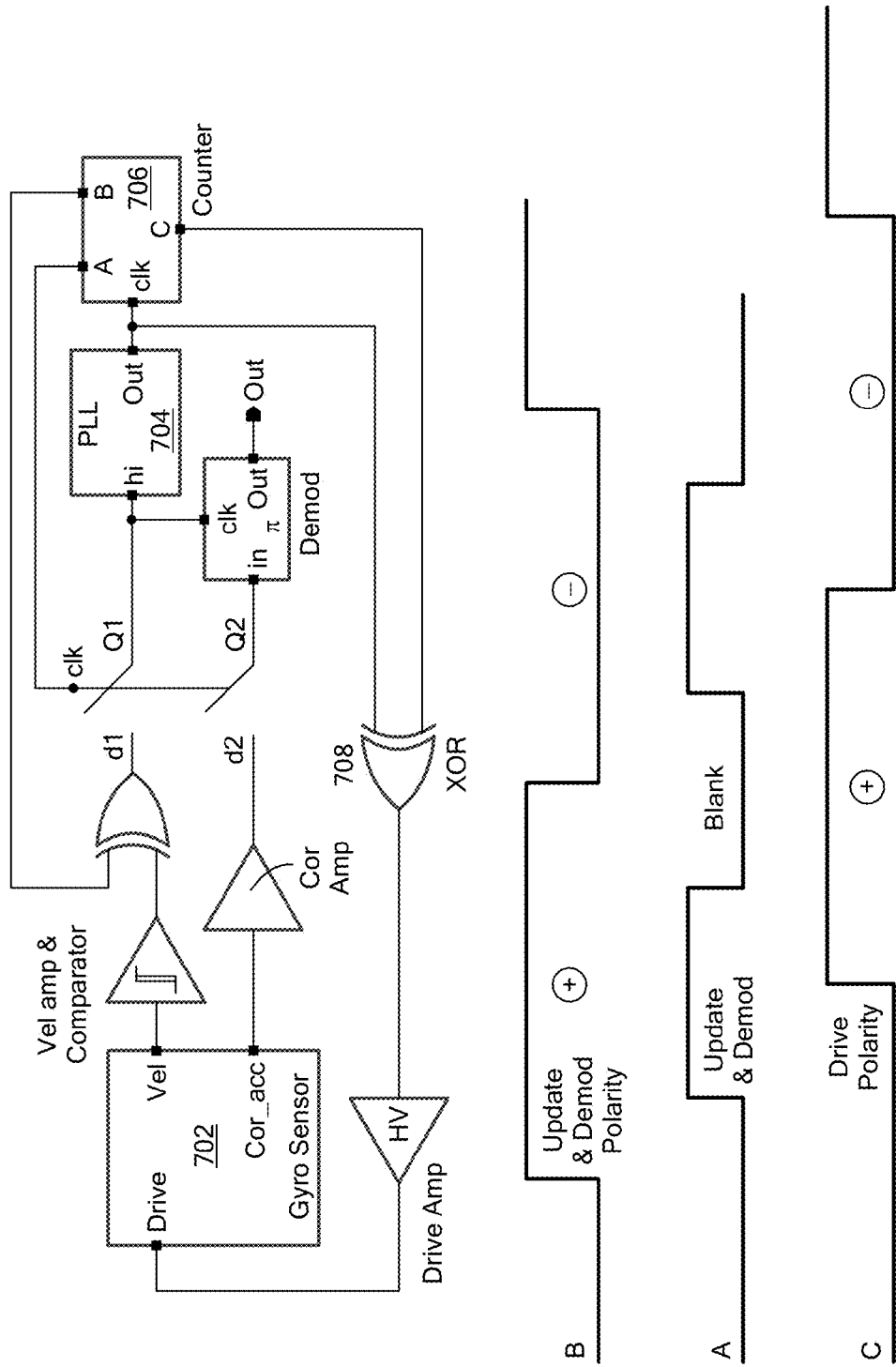
FIG. 7 is a schematic block diagram of a drive circuit with phase-locked loop (PLL) in accordance with the exemplary embodiment described with reference to FIG. 6.

FIG. 7 is a schematic block diagram of a drive circuit with PLL in accordance with the exemplary embodiment described with reference to FIG. 6. In essence, the PLL 704 outputs a reference signal based in part on the velocity (Vel) signal from the gyroscope 702. The PLL 704 output is passed to a counter 706 and also to one of the inputs of an XOR gate 708. The counter 706 output (labeled as "C"), which is passed to the other input of the XOR gate 708, switches every N cycles and determines the polarity of the drive signal applied to the gyroscope 702.

Figure 8:
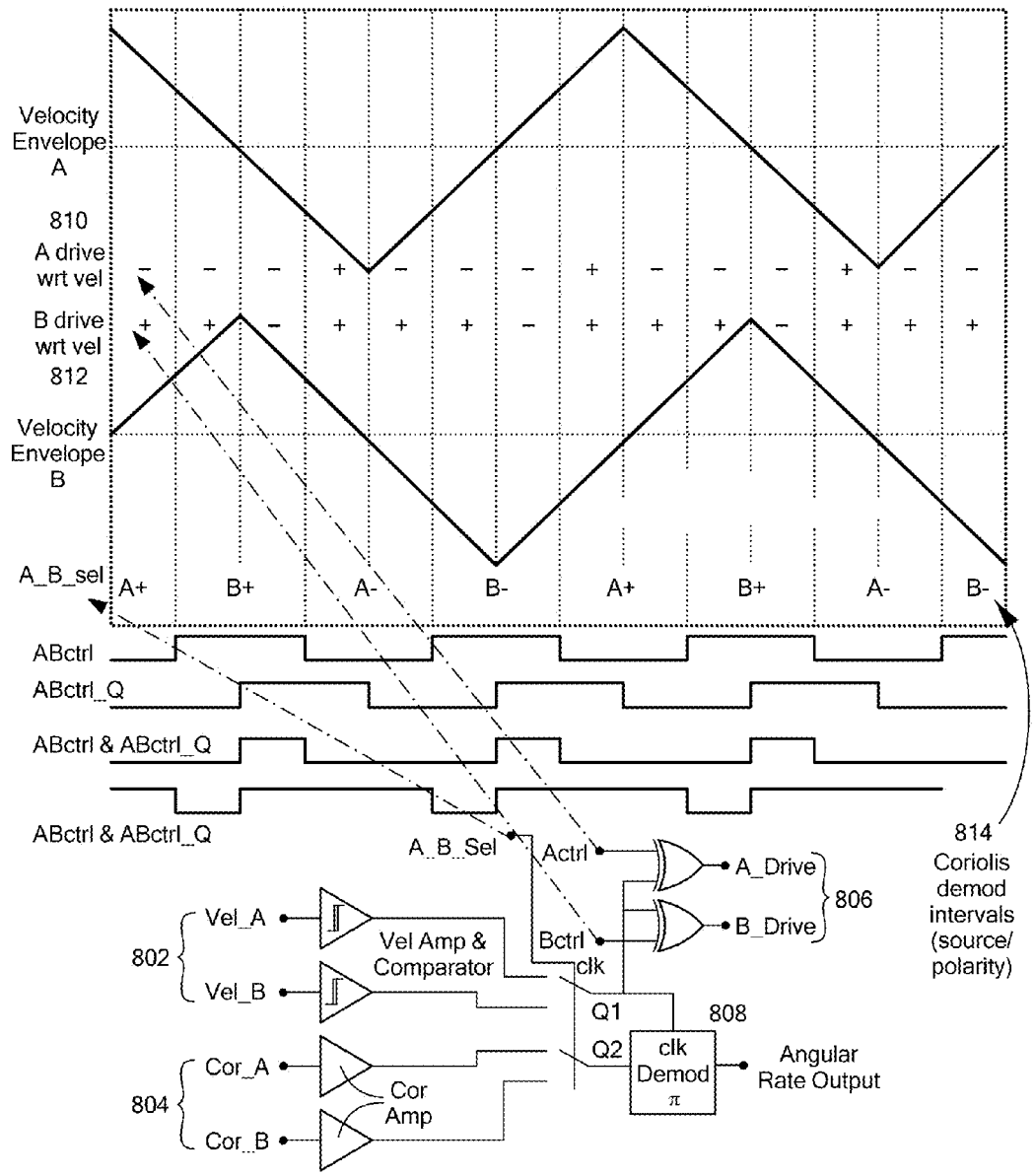
FIG. 8 schematically shows the amplitude envelopes, drive polarities, sense polarities, Coriolis sense window relationships, and circuitry for an exemplary dual gyroscope embodiment.

Another technique for keeping the shuttle oscillation running smoothly is to use two or more gyroscopes of similar type and frequency, with the amplitude modulation of the shuttles of the gyroscopes arranged so that one is at maximum while the other is passing through zero and vice-versa, and the drive for the lower amplitude shuttle being taken from the higher. This common drive system can be much simpler to implement than a PLL and advantageously can be configured to supply a continuous Coriolis signal, providing better SNR and enabling wider bandwidth than might otherwise be possible. The separation of phase at changeover of the drive sources should not cause any problem if the demodulation and Coriolis signal sources are correspondingly changed, as shown schematically by the amplitude and drive profiles for an exemplary dual gyroscope implementation in FIG. 8. In this example, the device has two gyroscopes designated A and B, with corresponding velocity circuitry 802 for processing the respective velocity outputs designated Vel_A and Vel_B, corresponding Coriolis circuitry 804 for processing the respective Coriolis outputs designated Cor_A and Cor_B, and corresponding drive circuitry 806 with appropriate switching logic for producing the respective drive signals designated A_Drive and B_Drive such that the drive for the lower amplitude shuttle is taken from the higher amplitude shuttle on an alternating basis. The device also includes a Coriolis demodulator 808 with appropriate switching logic for alternately demodulating the Cor_A and Cor_B signals based on the corresponding velocity signals to produce the angular rate output of the device, such that the angular rate output is alternately based on the Coriolis signal from gyroscope having the higher amplitude shuttle. In this figure, the polarity of the A drive with respect to velocity is shown in row 810, while the polarity of the B drive with respect to velocity is shown in row 812. The Coriolis demodulation intervals used to supply a continuous Coriolis signal (with indications of the source of the Coriolis signal as well as the polarity of the velocity signal against which the Coriolis signal is demodulated) are shown in row 814. Arrays of micromachined gyroscopes are commonly used to provide superior performance at moderate cost, so in many applications, the use of multiple gyroscopes may not involve additional expense.

Exemplary Gyroscope Configurations

As discussed above, the novel shuttle drive and acceleration sense techniques discussed above can be applied to many MEMS gyroscope configurations. Generally speaking, these techniques can be used with shuttles that operate in various resonance modes, e.g., with shuttles that oscillate back-and-forth or rotationally, or with shuttles that resonate in flexural or bulk acoustic modes. Furthermore, these techniques can be used in gyroscopes having a single shuttle or multiple shuttles. In embodiments that include multiple shuttles, two or more shuttles may be mechanically or electrically coupled so as to resonate at single resonance frequency. In various embodiments, the accelerometer mode may be in-plane or out-of-plane compared with the resonator mode.

Figure 9:
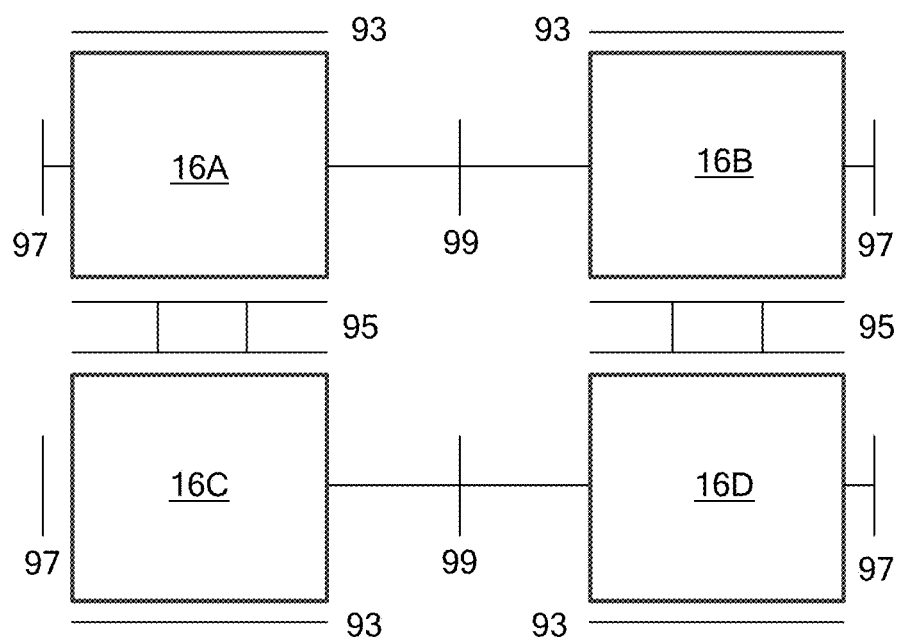
FIG. 9 is a schematic top-view diagram of an exemplary cross-quad gyroscope in which the novel shuttle drive and acceleration sense techniques discussed herein can be applied.

FIG. 9 is a schematic top-view diagram of an exemplary cross-quad gyroscope in which the novel shuttle drive and acceleration sense techniques discussed above can be applied. This gyroscope operates generally as disclosed in Geen, U.S. Pat. No. 7,421,897, which is hereby incorporated herein by reference in its entirety. Specifically, four gyroscopes 16A-D are arranged in a vertically and horizontally coupled cross-quad configuration such that the top pair of gyroscope frames and the bottom pair of gyroscope frames are interconnected by couplings 99 that allow anti-phase movements of the frames along separate parallel Y axes, while the left side pair of gyroscope frames and the right side pair of gyroscope frames are interconnected by couplings 95 that allow co-linear anti-phase movements of the frames. Each gyroscope is preferably supported on the side opposite the vertical coupling 95 by a suspension 93. The gyroscopes 16A-D may be similar to the gyroscopes disclosed in U.S. Pat. Nos. 6,505,511 and 6,122,961, each of which is hereby incorporated herein by reference in its entirety.

Figure 10:
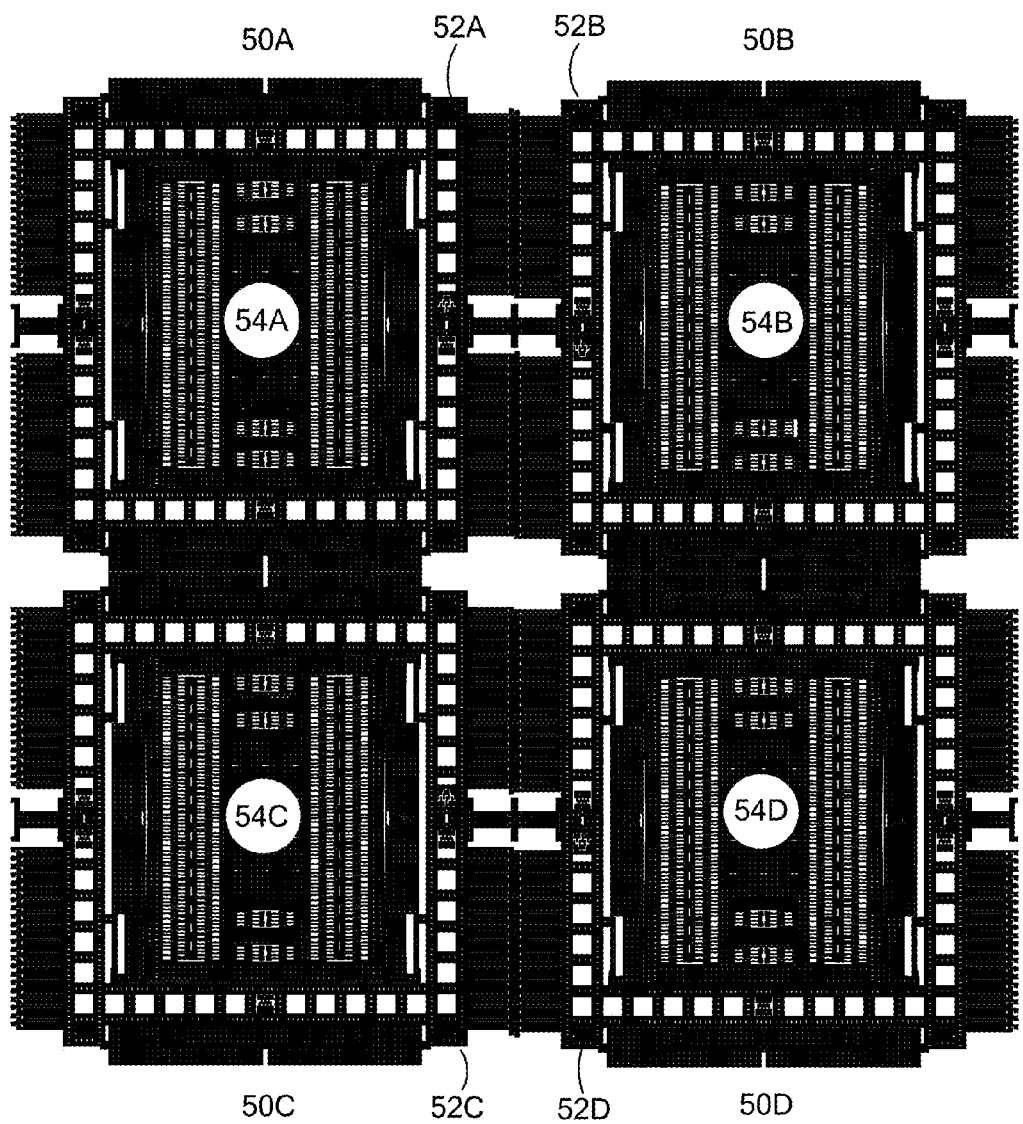
FIG. 10 shows a layered drawing for a first specific cross-quad gyroscope configuration in accordance with FIG. 9.

FIG. 10 shows a layered drawing for a first specific cross-quad gyroscope configuration in accordance with FIG. 9. Here, each gyroscope 50A, 50B, 50C, 50D includes a frame (52A, 52B, 52C, 52D) and a resonator (54A, 54B, 54C, 54D) movably suspended within the inner periphery of the frame. The frames 52A and 52B of gyroscopes 50A and 50B are coupled to one another, as are the frames 52C and 52C of gyroscopes 50C and 50D. Furthermore, the frames 52A and 52C of gyroscopes 50A and 50C are coupled to one another, as are the frames 52B and 52D of gyroscopes 50B and 50D.

In this exemplary embodiment, the resonators of each pair of gyroscopes 50A/50B and 50C/50D are operated in anti-phase to one another. Furthermore, in an exemplary embodiment of the invention, the resonators of gyroscopes 50A and 50B operate in anti-phase to the corresponding resonators of gyroscopes 50C and 50D. Therefore, the resonators of gyroscopes that are diagonally opposite operate in phase with one another, while the resonators of any pair of adjacent gyroscopes operate in anti-phase with one another.

Also, the frames of each pair of gyroscopes 50A/50B and 50C/50D are coupled to allow movement in opposite directions but substantially restrict movement in the same direction. Furthermore, in accordance with an exemplary embodiment of the invention, the frames of gyroscopes 50A and 50C are coupled to allow movement in opposite directions but substantially restrict movement in the same direction, as are frames of gyroscopes 50B and 50D. The frames of gyroscopes 50A/50C move in anti-phase to the frames of gyroscopes 50B/50D. Therefore, the frames of gyroscopes that are diagonally opposite operate in phase with one another, while the frames of any pair of adjacent gyroscopes operate in anti-phase with one another.

The resonators are caused to resonate back and forth in the X-axis. Rotation of the inertial sensor about the Z-axis causes displacement of the frames in the Y-axis. For example, under some conditions, frames 52A and 52C of gyroscopes 50A and 50C move toward one another while frames 52B and 52D of gyroscopes 50B and 50D move away from one another. Under some other conditions, frames 52A and 52C of gyroscopes 50A and 50C move away from one another while frames 52B and 52D of gyroscopes 50B and 50D move toward one another.

Figure 11:
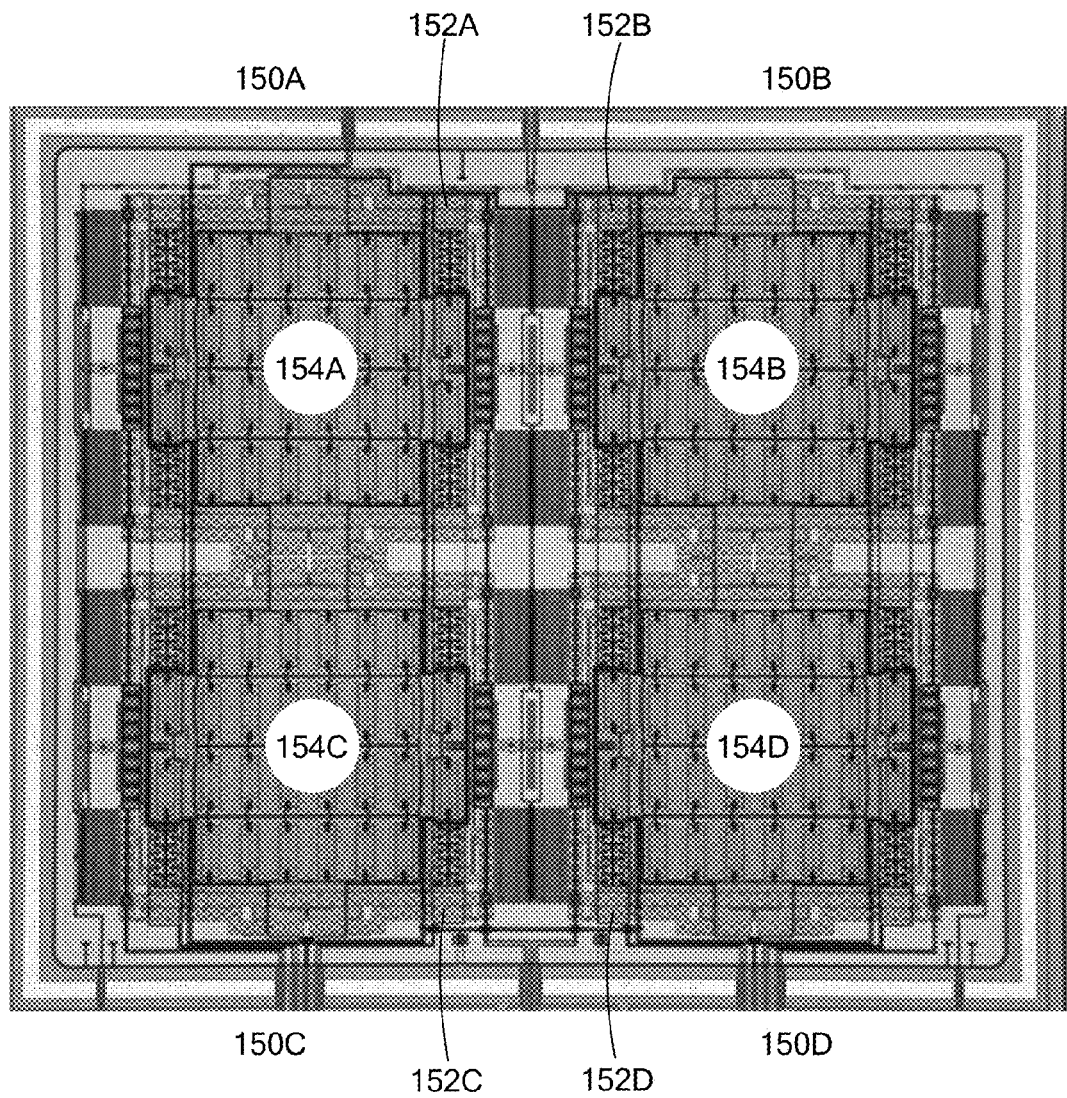
FIG. 11 shows a photograph of actual silicon for a second specific cross-quad gyroscope configuration in accordance with FIG. 9.

FIG. 11 shows a photograph of actual silicon for a second specific cross-quad gyroscope configuration in accordance with FIG. 9. As in the cross-quad gyroscope configuration shown in FIG. 10, each gyroscope 150A, 150B, 150C, 150D includes a frame (152A, 152B, 152C, 152D) and a resonator (154A, 154B, 154C, 154D) movably suspended within the inner periphery of the frame. The frames 152A and 152B of gyroscopes 150A and 150B are coupled to one another, as are the frames 152C and 152C of gyroscopes 150C and 150D. Furthermore, the frames 152A and 152C of gyroscopes 150A and 150C are coupled to one another, as are the frames 152B and 152D of gyroscopes 150B and 150D. The gyroscope operates substantially as the gyroscope of FIG. 10.

Figure 12:
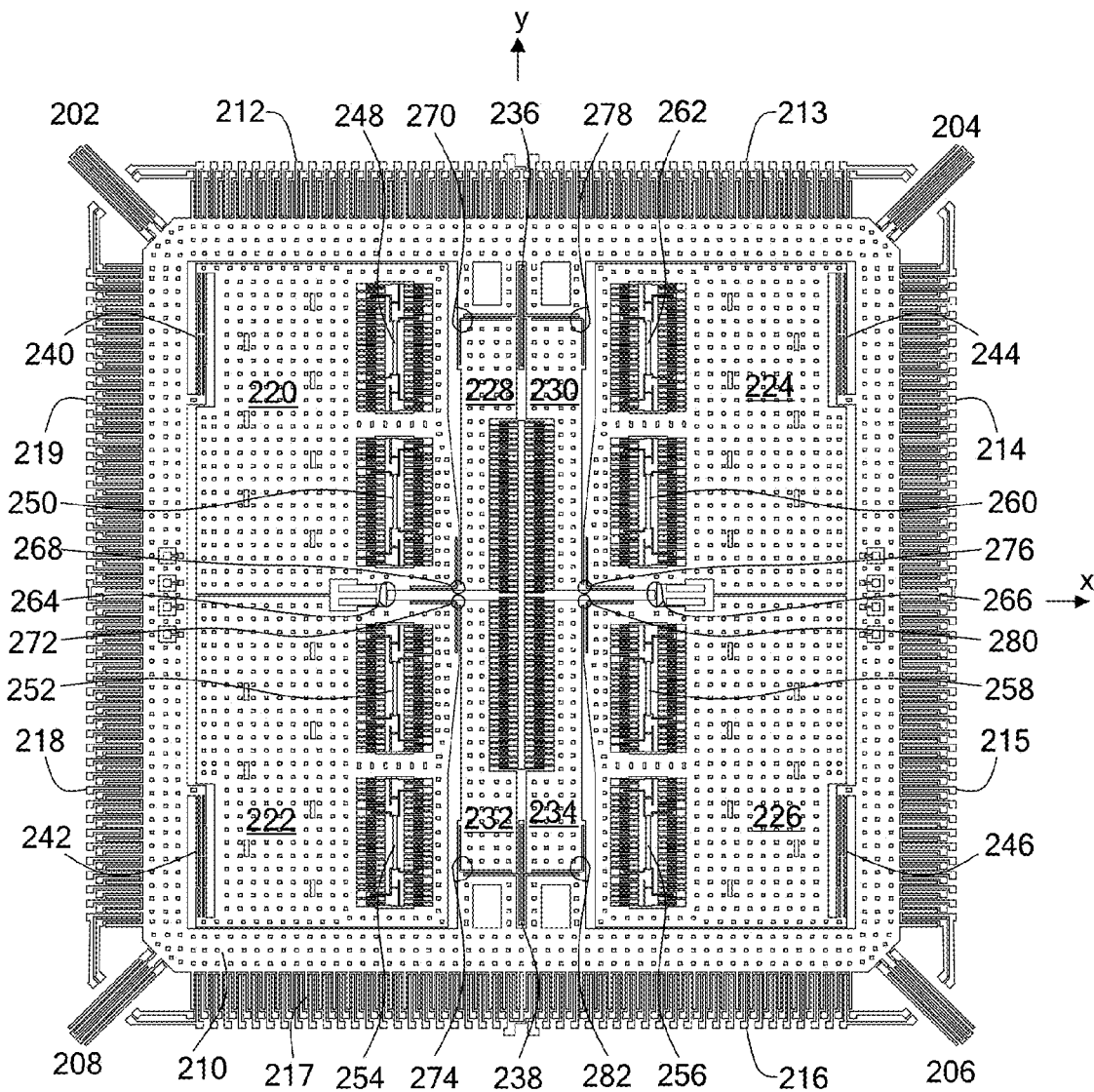
FIG. 12 is a schematic top-view diagram of an alternative vibratory gyroscope in which the novel shuttle drive and acceleration sense techniques discussed above can be applied.

FIG. 12 is a schematic top-view diagram of an alternative vibratory gyroscope in which the novel shuttle drive and acceleration sense techniques discussed above can be applied. This gyroscope operates generally as disclosed in Geen, U.S. Pat. No. 6,877,374 and Geen, U.S. Pat. No. 7,032,451, each of which is hereby incorporated herein by reference in its entirety. Among other things, this gyroscope structure includes a substantially square frame 210 that is suspended at its four corners by accelerometer suspension flexures 202, 204, 206, and 208. On the outside four edges of the frame 210 are fingers 212, 213, 214, 215, 216, 217, 218, and 219. Various resonating structures are suspended within the frame 210. These resonating structures include four movable shuttles 220, 222, 224, and 226, four levers 228, 230, 232, and 234, and two forks 236 and 238. It should be noted that the shuttles 222, 224, and 226 are substantially the same shape, size, and mass as the shuttle 220, and are oriented as mirror images of the shuttle 220 along the x and/or y axes. It should be noted that the levers 230, 232, and 234 are substantially the same shape, size, and mass as the lever 228, and are oriented as mirror images of the lever 228 along the x and/or y axes. The four movable shuttles 220, 222, 224, and 226 are suspended from the frame 210 by flexures 240, 242, 244, and 246, respectively. Movement of the four movable shuttles 220, 222, 224, and 226 is controlled electrostatically using electrostatic drivers 248, 250, 252, 254, 256, 258, 260, and 262. There are also electrostatic structures associated with the levers 228, 230, 232, and 234 that can be used for driving motion of the levers or sensing motion of the levers. These and other features of the micromachined gyroscope structure are described in more detail below.

The four accelerometer suspension flexures 202, 204, 206, and 208 are anchored to the substrate and are configured so as to substantially restrict movement of the frame 210 along the x axis and along the y axis (i.e., translational movement) while allowing the frame 210 to rotate more freely in either direction (i.e., rotational movement). Such rotational movement of the frame 110 is caused mainly from the Coriolis effect due to movement of the frame of reference of the resonating structures.

The fingers 212, 213, 214, 215, 216, 217, 218, and 219 extend from the four sides of the frame 210. Positioned between the fingers 212, 213, 214, 215, 216, 217, 218, and 219 are two sets of Coriolis sensors that are mechanically coupled to the substrate and do not move relative to the substrate. Movement of the frame 210 results in movement of the fingers 212, 213, 214, 215, 216, 217, 218, and 219 relative to the Coriolis sensors, which produces a change in capacitance that can be measured by electronic circuitry (not shown).

The resonating structures, including the shuttles 220, 222, 224, and 226, the flexures 240, 242, 244, and 246, the levers 228, 230, 232, and 234, and the forks 236 and 238, are mechanically coupled. The shuttles 220 and 222 are mechanically coupled via a pivot flexure 264, and the shuttles 224 and 226 are mechanically coupled via a pivot flexure 266. The shuttles 220 and 224 are mechanically coupled via the levers 228 and 230 and the fork 236, and the shuttles 222 and 226 are mechanically coupled via the levers 232 and 234 and the fork 238. The pivot flexures 264 and 266, the levers 228, 230, 232, and 234, and the forks 236 and 238 allow the shuttles 220, 222, 224, and 226 to move together.

The shuttle 220 is suspended from the frame 210 by the flexure 240, from the shuttle 222 by the pivot flexure 264, and from the lever 228 by the pivot flexure 268. The shuttle 222 is suspended from the frame 210 by the flexure 242, from the shuttle 220 by the pivot flexure 264, and from the lever 232 by the pivot flexure 272. The shuttle 224 is suspended from the frame 210 by the flexure 244, from the shuttle 226 by the pivot flexure 266, and from the lever 230 by the pivot flexure 276. The shuttle 226 is suspended from the frame 210 by the flexure 246, from the shuttle 224 by the pivot flexure 266, and from the lever 234 by the pivot flexure 280.

The lever 228 is suspended from the frame 210 by the pivot flexure 270, from the shuttle 220 by the pivot flexure 268, and from the lever 230 by the fork 236. The lever 230 is suspended from the frame 210 by the pivot flexure 278, from the shuttle 224 by the pivot flexure 276, and from the lever 228 by the fork 236. The lever 232 is suspended from the frame 210 by the pivot flexure 274, from the shuttle 222 by the pivot flexure 272, and from the lever 234 by the fork 238. The lever 234 is suspended from the frame 210 by the pivot flexure 282, from the shuttle 226 by the pivot flexure 280, and from the lever 232 by the fork 238.

The flexures 240, 242, 244, and 246 substantially restrict movement of the shuttles 220, 222, 224, and 226 respectively along the y axis, but allow movement of the shuttles 220, 222, 224, and 226 respectively along the x axis. The flexures 240, 242, 244, and 246 also allow the shuttles 220, 222, 224, and 226 respectively to pivot slightly as they move.

The pivot flexure 264 essentially locks the shuttles 220 and 222 together so that they move together. Likewise, the pivot flexure 266 essentially locks the shuttles 224 and 226 together so that they move together (although oppositely to the shuttles 220 and 222).

The levers 228 and 230, the fork 236, and the pivot flexures 268, 270, 276, and 278 essentially lock the shuttles 220 and 224 together so that they move in substantially equal but opposite directions. Likewise, the levers 232 and 234, the fork 238, and the pivot flexures 272, 274, 280, and 282 essentially lock the shuttles 222 and 226 together so that they move in substantially equal but opposite directions.

Other exemplary gyroscope configurations with shuttles that oscillate in a back-and-forth motion, and in which the novel shuttle drive and acceleration sense techniques discussed above can be applied, are described in Clark, U.S. Pat. No. 5,992,233; Lemkin, U.S. Pat. No. 7,051,590; Chaumet, U.S. Patent Application Publication No. 2008/0282833; and Saukoski, M., *System and Circuit Design for a Capacitive MEMS Gyroscope*, Doctoral Dissertation, TKK Dissertations 116, Helsinki University of Technology, Espoo, Finland (2008), each of which is hereby incorporated herein by reference in its entirety.

The present invention is in no way limited to or by the above gyroscope examples in which the novel shuttle drive and acceleration sense techniques discussed above can be applied. Embodiments of the present invention may include one-axis (e.g., x-axis, y-axis, or z-axis) inertial sensors, two-axis (e.g., x-y axis or x-z axis) inertial sensors, and three-axis inertial sensors with sensing of rotational and/or lateral acceleration(s). Furthermore, the shuttles may be configured to resonate in-plane or out-of-plane with respect to the nominal plane of the shuttles, and, similarly, acceleration sensing may be in-plane or out-of-plane with respect to the nominal plane of the shuttles.

Miscellaneous

It should be noted that headings are used above for convenience and are not to be construed as limiting the present invention in any way.

The drive and sense operations discussed above may be implemented in various forms, such as, for example, using discrete hardware components, integrated circuitry (e.g., an Application Specific Integrated Circuit (ASIC)), programmable logic for use with a programmable logic device (e.g., a Field Programmable Gate Array (FPGA) or other PLD), computer program logic for use with a digital signal processor or other processor, or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application.

Without limitation, potential subject matter that may be claimed (prefaced with the letter "P" so as to avoid confusion with the actual claims presented below) includes:

P1. In comb drive vibratory gyroscopes, the cancellation of drive-induced Coriolis accelerometer offset by demodulating the output during equal times of in-phase and anti-phase drive of the shuttle with respect to the velocity signal used for angular rate demodulation. This eliminates the corresponding thermal and die-stress effects otherwise needing calibration.

P2. The stabilization of effective shuttle velocity in the presence of ill-defined mechanical Q by using defined numbers of shuttle cycles continually ramping the amplitude of shuttle oscillation. This enables accurate definition of sensitivity without calibration using mechanical rotations.

P3. The use of equal or unequal drive-up and drive-down periods in conjunction with blanking to discard low amplitude signals and equalize the effective up and down periods of demodulation. This helps to optimize noise performance.

P4. The use of PLL to maintain the phase coherency of an amplitude modulated shuttle drive when the corresponding velocity feedback is small. This keeps the system running smoothly.

P5. The use of multiple gyros to maintain phase coherency while amplitude modulating shuttle motion. These gyros can be arranged to be mutually supporting improving the SNR and bandwidth of the system.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method of operating vibratory gyroscope having a shuttle and a Coriolis accelerometer, the method comprising:
   driving, by a first shuttle driver, vibratory motion of the shuttle using a drive signal having alternating phase and anti-phase drive signal periods; and
   demodulating, by a demodulator, output of the Coriolis accelerometer during equal times of phase and anti-phase drive of the shuttle with respect to a velocity signal used for angular rate demodulation.

2. A method according to claim 1, wherein the phase and anti-phase drive signal periods are unequal periods of time.

3. A method according to claim 1, wherein the drive signal is applied such that amplitude of shuttle oscillation does not cross zero during steady state operation.

4. A method according to claim 1, wherein the drive signal is applied such that amplitude of shuttle oscillation periodically crosses zero during steady state operation.

5. A method according to claim 1, wherein the Coriolis accelerometer output is demodulated continually.

6. A method according to claim 1, wherein the Coriolis accelerometer output is demodulated during intervals about the points of greatest shuttle amplitude with blanking between such intervals to discard low amplitude signals and equalize effective up and down periods of demodulation.

7. A method according to claim 1, further comprising:
   maintaining phase coherency of the shuttle drive using a phase-locked loop.

8. A method according to claim 1, further comprising:
   maintaining phase coherency of the shuttle drive using phase information from a second gyroscope operating in anti-phase with the gyroscope.

9. A method according to claim 1, wherein the equal times of phase and anti-phase drive of the shuttle during which the output of the Coriolis accelerometer is demodulated are centered at the transitions from the phase drive signal period to the anti-phase drive signal period.

10. A method according to claim 1, wherein the vibratory motion of the shuttle is driven using at least one comb drive electrode.

11. A method according to claim 1, wherein the vibratory motion of the shuttle is driven using at least one electrode capacitively coupled with the shuttle.

12. A method according to claim 1, wherein the vibratory motion of the shuttle is driven using at least one piezoelectric electrode.

13. A method according to claim 1, wherein the vibratory motion of the shuttle includes a flexural mode.

14. A method according to claim 1, wherein the vibratory motion of the shuttle includes a bulk acoustic mode.

15. A method according to claim 1, wherein the vibratory motion of the shuttle includes a rotational oscillation.

16. A method according to claim 1, wherein the vibratory motion of the shuttle includes a translational oscillation.

17. A method according to claim 1, wherein the shuttle and the Coriolis accelerometer operate in the same plane.

18. A method according to claim 1, wherein the shuttle and the Coriolis accelerometer operate in different planes.

19. A method according to claim 1, wherein the phase and anti-phase drive signal periods are equal periods of time.

20. A method according to claim 10, wherein the equal periods of time are defined as a predetermined number of shuttle cycles, and wherein the drive signal is applied such that amplitude of shuttle oscillation is continually ramping without reaching a theoretical maximum shuttle amplitude.

21. A gyroscope comprising:
   a first shuttle;
   a first shuttle driver;
   a Coriolis accelerometer; and
   a demodulator, wherein the first shuttle driver is configured to drive vibratory motion of the first shuttle using a first drive signal having alternating phase and anti-phase drive signal periods, and wherein the demodulator is configured to demodulate output of the Coriolis accelerometer during equal times of phase and anti-phase drive of the first shuttle with respect to a velocity signal used for angular rate demodulation.

22. A gyroscope according to claim 21, wherein the phase and anti-phase drive signal periods are unequal periods of time.

23. A gyroscope according to claim 21, wherein the drive signal is applied such that amplitude of shuttle oscillation does not cross zero during steady state operation.

24. A gyroscope according to claim 21, wherein the drive signal is applied such that amplitude of shuttle oscillation periodically crosses zero during steady state operation.

25. A gyroscope according to claim 21, wherein the Coriolis accelerometer output is demodulated continually.

26. A gyroscope according to claim 21, wherein the Coriolis accelerometer output is demodulated during intervals about the points of greatest shuttle amplitude with blanking between such intervals to discard low amplitude signals and equalize effective up and down periods of demodulation.

27. A gyroscope according to claim 12, wherein:
   phase coherency of the shuttle drive is maintained using a phase-locked loop.

28. A gyroscope according to claim 12, further comprising:
   a second shuttle; and
   a second shuttle driver configured to drive vibratory motion of the second shuttle, wherein the second shuttle driver is configured to operate in anti-phase with the first shuttle driver such that amplitude/velocity of the first shuttle is near its maximum when the amplitude/velocity of the second shuttle is near its minimum and vice versa, and wherein phase coherency of each shuttle/driver is maintained using phase information from the other shuttle/driver.

29. A gyroscope according to claim 12, wherein the equal times of phase and anti-phase drive of the shuttle during which the output of the Coriolis accelerometer is demodulated are centered at the transitions from the phase drive signal period to the anti-phase drive signal period.

30. A gyroscope according to claim 21, wherein the vibratory motion of the shuttle is driven using at least one comb drive electrode.

31. A gyroscope according to claim 21, wherein the vibratory motion of the shuttle is driven using at least one electrode capacitively coupled with the shuttle.

32. A gyroscope according to claim 21, wherein the vibratory motion of the shuttle is driven using at least one piezoelectric electrode.

33. A gyroscope according to claim 21, wherein the vibratory motion of the shuttle includes a flexural mode.

34. A gyroscope according to claim 21, wherein the vibratory motion of the shuttle includes a bulk acoustic mode.

35. A gyroscope according to claim 21, wherein the vibratory motion of the shuttle includes a rotational oscillation.

36. A gyroscope according to claim 21, wherein the vibratory motion of the shuttle includes a translational oscillation.

37. A gyroscope according to claim 21, wherein the shuttle and the Coriolis accelerometer operate in the same plane.

38. A gyroscope according to claim 21, wherein the shuttle and the Coriolis accelerometer operate in different planes.

39. A gyroscope according to claim 21, wherein the phase and anti-phase drive signal periods are equal periods of time.

40. A gyroscope according to claim 39, wherein the equal periods of time are defined as a predetermined number of shuttle cycles, and wherein the drive signal is applied such that amplitude of shuttle oscillation is continually ramping without reaching a theoretical maximum shuttle amplitude.

41. A gyroscope control circuit for a vibratory gyroscope having a shuttle and a Coriolis accelerometer, the gyroscope control circuit comprising:
a first shuttle driver configured to drive vibratory motion of the shuttle using a first drive signal having alternating phase and anti-phase drive signal periods; and
a demodulator configured to demodulate output of the Coriolis accelerometer during equal times of phase and anti-phase drive of the shuttle with respect to a velocity signal used for angular rate demodulation.

42. A gyroscope control circuit according to claim 41, wherein the phase and anti-phase drive signal periods are unequal periods of time.

43. A gyroscope control circuit according to claim 41, wherein the drive signal is applied such that amplitude of shuttle oscillation does not cross zero during steady state operation.

44. A gyroscope control circuit according to claim 41, wherein the drive signal is applied such that amplitude of shuttle oscillation periodically crosses zero during steady state operation.

45. A gyroscope control circuit according to claim 41, wherein the Coriolis accelerometer output is demodulated continually.

46. A gyroscope control circuit according to claim 41, wherein the Coriolis accelerometer output is demodulated during intervals about the points of greatest shuttle amplitude with blanking between such intervals to discard low amplitude signals and equalize effective up and down periods of demodulation.

47. A gyroscope control circuit according to claim 41, wherein phase coherency of the shuttle drive is maintained using a phase-locked loop.

48. A gyroscope control circuit according to claim 41, wherein phase coherency of the shuttle drive is maintained using phase information from a second gyroscope operating in anti-phase with the gyroscope.

49. A gyroscope control circuit according to claim 41, wherein the equal times of phase and anti-phase drive of the shuttle during which the output of the Coriolis accelerometer is demodulated are centered at the transitions from the phase drive signal period to the anti-phase drive signal period.

50. A gyroscope control circuit according to claim 41, wherein the vibratory motion of the shuttle is driven using at least one comb drive electrode.

51. A gyroscope control circuit according to claim 41, wherein the vibratory motion of the shuttle is driven using at least one electrode capacitively coupled with the shuttle.

52. A gyroscope control circuit according to claim 41, wherein the vibratory motion of the shuttle is driven using at least one piezoelectric electrode.

53. A gyroscope control circuit according to claim 41, wherein the vibratory motion of the shuttle includes a flexural mode.

54. A gyroscope control circuit according to claim 41, wherein the vibratory motion of the shuttle includes a bulk acoustic mode.

55. A gyroscope control circuit according to claim 41, wherein the vibratory motion of the shuttle includes a rotational oscillation.

56. A gyroscope control circuit according to claim 41, wherein the vibratory motion of the shuttle includes a translational oscillation.

57. A gyroscope control circuit according to claim 41, wherein the shuttle and the Coriolis accelerometer operate in the same plane.

58. A gyroscope control circuit according to claim 41, wherein the shuttle and the Coriolis accelerometer operate in different planes.

59. A gyroscope control circuit according to claim 41, wherein the phase and anti-phase drive signal periods are equal periods of time.

60. A gyroscope control circuit according to claim 59, wherein the equal periods of time are defined as a predetermined number of shuttle cycles, and wherein the drive signal is applied such that amplitude of shuttle oscillation is continually ramping without reaching a theoretical maximum shuttle amplitude.

61. A gyroscope comprising:
means for driving vibratory motion of a shuttle using a drive signal having alternating phase and anti-phase drive signal periods; and
means for demodulating output of a Coriolis accelerometer during equal times of phase and anti-phase drive of the shuttle with respect to a velocity signal used for angular rate demodulation.

* * * * *

UNITED STATES PATENT AND TRADEMARK OFFICE
CERTIFICATE OF CORRECTION

Page 1 of 1

PATENT NO. : 9,212,908 B2
APPLICATION NO. : 13/456706
DATED : December 15, 2015
INVENTOR(S) : John A. Geen et al.

It is certified that error appears in the above-identified patent and that said Letters Patent is hereby corrected as shown below:

In the claims,

In Col. 15, line 11
insert --a-- before "vibratory"

In Col. 16, line 3
replace "claim 10"
with --claim 19--

In Col. 16, line 36
replace "claim 12"
with --claim 21--

In Col. 16, line 39
replace "claim 12"
with --claim 21--

In Col. 16, line 50
replace "claim 12"
with --claim 21--

Signed and Sealed this
First Day of March, 2016

Michelle K. Lee
*Director of the United States Patent and Trademark Office*